United States Patent [19]
Stahl

[11] 3,912,674
[45] Oct. 14, 1975

[54] ETHYLENE COPOLYMER DISPERSIONS AS WATER REPELLENT COATINGS

[75] Inventor: Roland Edgar Stahl, Wilmington, Del.

[73] Assignee: E. I. Du Pont de Nemours and Company, Wilmington, Del.

[22] Filed: Sept. 12, 1974

[21] Appl. No.: 505,492

Related U.S. Application Data

[63] Continuation-in-part of Ser. No. 355,501, April 30, 1973, abandoned.

[52] U.S. Cl.... 260/23 AR; 260/27 EV; 260/28.5 R; 260/28.5 A; 260/28.5 AV; 260/29.6 T; 260/897 B
[51] Int. Cl.² ........................................ C08L 91/06
[58] Field of Search.. 260/28.5 R, 28.5 A, 28.5 AV, 260/29.6 T, 897 B, 27 EV, 23 AR

[56] References Cited
UNITED STATES PATENTS

| | | | |
|---|---|---|---|
| 3,345,318 | 10/1967 | Lindemann et al. | 260/29.6 TA |
| 3,347,811 | 10/1967 | Bissot | 260/34.2 |

*Primary Examiner*—Melvyn I. Marquis

[57] ABSTRACT

An aqueous ethylene copolymer dispersion, from which an improved water-repellent coating can be applied, is provided. The dispersion comprises a dispersion of an ethylene ionic copolymer and a paraffin wax held in dispersed phase by an amine soap surfactant and a terpolymer of vinyl acetate, ethylene and N-methylol acrylamide. A fabric having thereon a coating of the dispersed phase of the dispersion and a process for preparing the coated fabric are also provided.

6 Claims, No Drawings

ETHYLENE COPOLYMER DISPERSIONS AS WATER REPELLENT COATINGS

CROSS-REFERENCE TO RELATED APPLICATION

This application is a continuation-in-part of application Ser. No. 355,501, filed Apr. 30, 1973, now abandoned.

BACKGROUND OF THE INVENTION

1. Field of the Invention

This invention relates to aqueous dispersions of ethylene copolymers, wax and a terpolymer of vinyl acetate, ethylene and N-methylol acrylamide which produce water-repellent coatings.

2. Prior Art

Wax containing compositions as water-repellent coatings are well known, as indicated by such sources as "Waterproofing Textiles - 1970", M. W. Ranney, Editor, Noyes Data Corporation, Park Ridge, New Jersey. Such coatings tend to have certain disadvantageous characteristics: (1) a slippery feel or hand, making the finish feel almost wet, (2) crocking (tendency of the coating to rub off) is generally poor, (3) coating weights are usually relatively heavy; the coating weight is usually about one-half or more of the fabric weight, and (4) when coatings are applied from a hydrocarbon solvent, there are problems due to toxicity to workers, atmospheric pollution, and flammability.

More recently aqueous coatings based on ethylene copolymers/wax dispersions have been developed. Such coatings offer beneficial properties: (1) dry hand, (2) improved dry crock resistance, (3) lower coating weights, one-third to four-tenths of the fabric weight, (4) hydrocarbon solvents are eliminated.

There are basically two types of textile water-repellent coatings: (I) those having poor to medium wash fastness (wax, resin, pyridinium or silicone based), and (II) those having excellent wash fastness (fluorocarbon based). Although type (I) water-repellent coatings do not have the wash fastness of the type (II) coatings, type (I) coatings are often preferred. For example, type (I) coatings are usually more economical.

Aqueous dispersions from which type (I) water-repellent coatings can be applied are described in U.S. Pat. No. 3,347,811, issued to T. C. Bissot on Oct. 17, 1967, and U.S. Pat. No. 3,296,172, issued to D. L. Funck and V. C. Wolff, Jr., on Jan. 3, 1967. Although these coatings are useful and have good water-repellent characteristics, a type (I) water repellent having completely satisfactory water-repellent characteristics, such as initial water repellency has not yet been provided. U.S. Pat. No. 3,347,811 describes an ethylene copolymer wherein the alpha-beta-ethylenically unsaturated carboxylic acid groups are not neutralized with alkali ions. The surfactant used is sodium dodecyl sulfate, a surfactant not characterized as an amine soap, which produces, as illustrated in Example 23, a coating which gives poor hydrostatic pressure test results.

Bissot U.S. Pat. No. 3,487,036 discloses aqueous dispersions of ethylene (30 to 95 weight percent) and at least one comonomer having polar characteristics (5 to 70 weight percent), e.g., acrylic acid, methacrylic acid, and a paraffin wax dispersed by a dimerized wood rosin. The dispersions are useful in the textile industry as lubrication, waterproofing and binders for nonwoven fabrics. The Bissot patent does not disclose the presence of ionic copolymers in the dispersion or the presence of a terpolymer emulsion. The Bissot dispersions, when coated on fabric and dried, do not exhibit a soft hand and exhibit inferior coating adhesion.

U.S. Pat. No. 3,741,925 discloses an aqueous dispersion having an ethylene copolymer comprising at least 30 percent by weight ethylene and up to 70 percent by weight of at least one comonomer having polar characteristics, a wax, an ammonium salt of a mineral acid, and from 0 to 25 percent by weight of an amino-formaldehyde resin, such as hexamethoxymethylmelamine. Although that system represents an improvement over the prior art, it too has at least one disadvantage in commercial operation; the compositions tend to thicken on standing. The thickening process can cause difficulty in applying coatings with a pattern box, or it may proceed to the point where the coating is completely coagulated.

U.S. Pat. No. 3,756,973 discloses storage-stable aqueous dispersions having an ethylene copolymer comprising at least 30 percent by weight ethylene and up to 70 percent by weight of an alpha, beta-ethylenically unsaturated carboxylic acid having up to 75 percent of its acid groups neutralized with alkali metal ions, wax, and water-soluble, low molecular weight methylated melamine-formaldehyde resin. Use of the low molecular weight methylated melamine-formaldehyde resin permits an increased curing rate. The resin also permits curing without catalysts, ammonium salts of mineral acids, which cause thickening of the dispersion. While the dispersion is viscosity stable, fabrics having sufficient add-on or coating weight for good water repellency tend to be boardy, i.e., have a stiff hand.

Coatings made from vinyl acetate/ethylene/N-methylol acrylamide terpolymer emulsion such as described in U.S. Pat. No. 3,345,318 do not have satisfactory water repellency. As illustrated in Example 28 when 5.5 percent by weight amount of ethylene in the terpolymer component is present the hand was boardy. In Example 29 when 17.6 percent by weight ethylene is present the rain test was unexpectedly marginal.

SUMMARY OF THE INVENTION

According to the present invention there is provided an aqueous dispersion comprising a mixture of (1) a dispersion of an ethylene copolymer comprising at least 30 percent by weight ethylene and up to 70 percent by weight of an alpha, beta-ethylenically unsaturated carboxylic acid, 40 to 75 percent of said acid groups being neutralized with alkali metal ions, and a paraffin wax, the dry weight ratio of wax to ethylene copolymer being 1:1 to 19:1, the ethylene copolymer and wax dispersion being held in dispersed phase by 1.0 to 15.0 percent by weight, based on the weight of ethylene copolymer and wax, of an amine soap surfactant, and (2) a terpolymer emulsion comprising 64 to 77 percent by weight vinyl acetate, 20 to 30 percent by weight ethylene and 3 to 6 percent by weight N-methylol acrylamide, the ratio of ethylene copolymer and wax dispersion to terpolymer emulsion being from 70:30 to 20:80. The dispersions give excellent water repellent properties to a variety of fabrics. The dispersions can be applied to the fabrics by ordinary methods, dried and cured by heating. In addition, the coated fabrics have the advantages of soft hand, excellent viscosity stability of formulated mixtures, acceptance of mildewcides or fungicides without adversely affecting viscosity stability, and good crock fastness.

DETAILED DESCRIPTION OF THE INVENTION

The essential ingredients of the present dispersion comprise, in aqueous medium, a dispersion of an ethylene/alpha, beta-ethylenically unsaturated carboxylic acid ionic copolymer, and a paraffin wax, and a terpolymer of vinyl acetate/ethylene/N-methylol acrylamide. The ethylene copolymer dispersion is held in dispersed phase by means of an amine soap surfactant.

The ethylene copolymers useful in this invention have an ethylene content of at least 30 percent by weight, preferably 30 to 95 percent by weight, and up to 70 percent by weight, preferably 5 to 70 percent by weight, of an alpha, beta-ethylenically unsaturated carboxylic acid. Examples of suitable alpha, beta-ethylenically unsaturated carboxylic acids are acrylic acid, methacrylic acid, itaconic acid, maleic acid, fumaric acid, and aconitic acid. The acid moiety of the copolymer is partially neutralized, e.g., about 40 to about 75 percent of the acid groups neutralized, with alkali metal ions, e.g., sodium, potassium, etc. Such partially neutralized copolymers are commonly referred to as ionomers.

A particularly preferred copolymer is a copolymer of ethylene and methacrylic acid having at least 70 percent by weight of ethylene and up to 30 percent by weight of methacrylic acid. Such copolymers are generally prepared by high-pressure, free-radical catalytic processes, but they can also be prepared by low-pressure coordination catalytic processes. The molecular weight can be varied over a wide range; however, copolymers having molecular weights corresponding to melt indexes of 5 to 1,000, preferably 150 or less, are especially suited for use in this invention. Copolymer melt index is determined as described in ASTM D-1238-65T.

The waxes useful in combination with the ethylene copolymers are the paraffin waxes of petroleum origin. These materials are normally very difficult to convert into stable aqueous dispersions without downgrading many of their inherent desirable properties. These waxes are mixtures of solid hydrocarbons derived from the overhead wax distillate fraction obtained from fractional distillation of petroleum. After purification, the paraffin wax contains hydrocarbons that fall within the formulas $C_{23}H_{48}$ to $C_{35}H_{78}$. The waxes are hard, colorless, and translucent materials having melting points generally in the range from about 120° to 200°F., preferably 120° to 180°F. An especially preferred paraffin wax melts in the range of from 143° to 153°F.

The ethylene copolymer/wax dispersion can be prepared by any means known in the art. The ethylene ionic copolymer and wax can be separately dispersed in aqueous media and then mixed or can be codispersed according to the method disclosed in French Pat. No. 70.06669. It has been found that to prepare an effective dispersion a particular class of surfactants known as amine soaps are useful. The term "amine soaps" means those surfactants which are formed from long chained fatty acids and amines. To those skilled in the art of emulsion chemistry, these belong to the anionic class of surface active materials. This type of surfactant is particularly useful for water-repellent coatings. The chemistry of the amine soaps in the drying of the coating can be represented by the following equation:

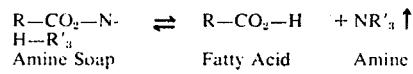

Where $R'=H$, the amine is ammonia which is volatilized in drying, driving the reaction to completion. Excellent discussions of amine soaps can be found in Paul Becher, "Emulsions: Theory and Practice", Reinhold Publishing Corporation, New York, 1957, pages 166ff, and in David C. Blackley, "High Polymer Latices", Volume I, Palmerton Publishing Company, Inc., New York, 1966, pages 99ff.

The amine soaps are present in the dispersion in amounts of about 1 to 15 percent by weight, preferably 3 to 7 percent by weight, based on the weight of ethylene copolymer and wax. Useful amine salts are ammonium and volatile amine salts of wood rosin (abietic acid), dimerized wood rosin and fatty acids having about 17 to 24 carbon atoms, e.g., ammonium oleate, ammonium stearate, ammonium erucate. The ammonium salt of dimerized wood rosin is preferred. Wood rosin and dimerized wood rosin are discussed in U.S. Pat. No. 3,487,036, column 4, lines 24 to 66.

The weight ratio of wax to ethylene copolymer is an important consideration because of two performance properties involved; namely, water repellency and coating adhesion (crock resistance). Water repellency, or the ability of the coated fabric to shed water, is a function of the wax content. Higher wax contents give better water repellency. The ethylene/alpha, beta-ethylenically unsaturated carboxylic acid component provides adhesion to the fabric, more specifically, the acid functionality of the copolymer provides adhesion. Therefore, it is desirable to increase the ethylene/alpha, beta-ethylenically unsaturated carboxylic acid copolymer content or, more preferably, increase the alpha, beta-ethylenically unsaturated carboxylic acid content, in the copolymer/wax combination. Obviously, both wax and alpha, beta-ethylenically unsaturated carboxylic acid content cannot be increased beyond certain limits. A workable range of weight ratios of wax to ethylene copolymer is about from 1:1 to 19:1, preferably from 1:1 to 6:1, and more preferably from 1.5:1 to 6:1.

The terpolymer emulsion has a solids composition range in weight percent of 64 to 77 vinyl acetate, 20 to 30 ethylene, and 3 to 6 N-methylol acrylamide. The terpolymer is useful having the content of components within the given range. It has been found that the hand softness is particularly related to the ethylene component. It is not desirable to decrease the ethylene content below about 20 weight percent because of the increase of modulus of the terpolymer and poor water repellent properties. The fabric coated therewith would have a boardy or harsh hand. Increased amounts of vinyl acetate tend to make the coated fabric stiff. N-methylol acrylamide within the stated range provides good body, tensile strength and cross-linkability.

While the particular method of preparing the terpolymers is not limited, a particularly suitable method is a batch process which involves first polymerizing a portion (usually about 10%) of the vinyl acetate under an ethylene pressure in an emulsion and, thereafter, continuously adding the remaining vinyl acetate and N- methylol acrylamide to the reaction vessel. The polymerization is accomplished in the presence of a catalyst and at least one emulsifying agent, portions of which are added initially and with the continuous addition. The aqueous system is preferably maintained, by a suitable buffering agent, at a pH of 5 to 7 during the polymerization. Polymerization temperatures and ethylene pressures are preferably 40°–80°C. and 100–2000 psi., respectively, the higher pressures being used when it is desired to introduce a relatively large amount of ethylene into the interpolymer.

An additional general method of preparing the present terpolymers is described in Netherlands application No. 6,604,289 and French Pat. No. 1,422,857 as follows:

Vinyl acetate and ethylene are copolymerized in the presence of the N-methylol acrylamide in an aqueous medium under pressures not exceeding 100 atmospheres in the presence of a catalyst and at least one emulsifying agent, the aqueous system being maintained, by a suitable buffering agent, at a pH of 2 to 6, the catalyst being added incrementally. The process is a batch process which involves first a homogenization period in which the vinyl acetate suspended in water is thoroughly agitated in the presence of ethylene under the working pressure to effect solution of the ethylene in the vinyl acetate up to the substantial limit of its solubility under the conditions existing in the reaction zone, while the vinyl acetate is gradually heated to polymerization temperature (30°–80°C., preferably 50°C.). The homogenization period is followed by a polymerization period during which the catalyst, which consists of a main catalyst or initiator, and may include an activator, is added incrementally, and the N-methylol acrylamide is similarly added incrementally, the pressure in the system being maintained substantially constant (10–100 atm.) by application of a constant ethylene pressure.

Various free-radical forming catalysts can be used in carrying out the polymerization to prepare the present terpolymers. For example, combination type catalysts employing both reducing agents and oxidizing agents can be used. The use of this type of combined catalyst is generally referred to in the art as "redox polymerization" or "redox system". The reducing agent is also often referred to as an activator and the oxidizing agent as an initiator. Suitable reducing agents or activators include bisulfites, dithionites, sulfoxylates, or other compounds having reducing properties such as ferrous salts, and tertiary amines; e.g., N-N-dimethyl aniline. The oxidizing agents or initiators include hydrogen peroxide, organic peroxides, such as benzoyl peroxide, t-butyl hydroperoxide and the like; persulfates, such as ammonium or potassium persulfate; perborates, and the like. Specific combination type catalysts or redox systems which can be used include hydrogen peroxide, ammonium persulfate, or potassium persulfate, with sodium metabisulfite, sodium bisulfite, ferrous sulfate, dimethyl aniline, zinc formaldehyde sulfoxylate, sodium dithionite, or sodium formaldehyde sulfoxylate. In general, redox catalyst systems are described, for example, in "Fundamental Principles of Polymerization" by G. F. D'Alelio (John Wiley and Sons, Inc., New York, 1962) pages 333 et seq. Other types of catalysts are well known in the art and can also be used to polymerize the monomers, with or without the addition of reducing agents or other activating materials.

The catalyst is generally employed in an amount of 0.1–2%, preferably 0.5–1.5%, based on the weight of vinyl acetate introduced into the system. With a redox catalyst, the initiator is generally present in an amount of 2–5 times that of the activator.

Nonionic or anionic emulsifying agents, as well as mixtures, can be used in preparing the terpolymers. Suitable nonionic emulsifying agents include polyoxyethylene condensates. Polyoxyethylene condensates can be represented by the general formula:

R (Ch$_2$—CH$_2$—O)$_n$H where R is the residue of a fatty alcohol containing 10–18 carbon atoms, an alkyl phenol, a fatty acid containing 10–18 carbon atoms, an amide, an amine, or a mercaptan, and where n is an integer of 1 or above. Some specific examples of polyoxyethylene condensates which can be used include: polyoxyethylene aliphatic ethers, such as polyoxyethylene lauryl ether, polyoxyethylene oleyl ether, polyoxyethylene hydroabietyl ether and the like; polyoxyethylene alkaryl ethers, such as polyoxyethylene nonylphenyl ether, polyoxyethylene octylphenyl ether and the like; polyoxyethylene esters of higher fatty acids, such as polyoxyethylene laurate, polyoxyethylene oleate and the like, as well as condensates of ethylene oxide with resin acids and tall oil acids; polyoxyethylene amide and amine condensates, such as N-polyoxyethylene lauramide, and N-lauryl-N-polyoxyethylene amine and the like; and polyoxyethylene thio-ethers, such as polyoxyethylene n-dodecyl thio-ether. Other nonionic emulsifiers, such as the sugar esters of long-chain monocarboxylic acids with 8–20 carbon atoms are useful as well.

Preferred emulsifying agents include monoalkyl phenoxy polyethylene oxide ester of phosphoric acid ("Triton" QS-9 of Rohm & Haas), preferably 3.0% by weight of polymer.

Suitable anionic emulsifiers can be characterized by the following: salts of sulfosuccinic acid esters; salts of higher alkyl sulfonic acids and alkyl aryl sulfonic acids; and salts of long-chain alkyl monocarboxylic acids. The concentration range of the total amount of emulsifying agents useful is about 0.5 to 5%, based on the aqueous phase of the dispersion regardless of the solids content.

The dry weight ratio of ethylene copolymer/wax to terpolymer emulsion is from 70:30 to 20:80, preferably 50:50 to 30:70, all on a dry weight basis.

The aqueous dispersion of this invention may be applied to fabrics by simply using the above essential ingredients, for some applications it may be desirable to add one or more auxiliary ingredients to achieve certain performance properties, to impart color, to use the coating in a specific manner, or to use a specific type of equipment. Such auxiliary ingredients or additives include: fillers, pigments, thickeners, mildewcides or fungicides, defoamers, etc. as are described below.

While almost any of the filters known in the art can be used, the preferred filler types are kaolin (aluminum silicate) and talc (magnesium silicate) and whiting (calcium carbonate). The preferred average particle size of these fillers is 0.1 to 35 microns, more preferably from 0.1 to 30 microns, and most preferably from 0.3 to 25 microns.

The quantity of filler can vary over a wide range. The filler to binder ratio (binder being defined as the total solids weight of ethylene copolymer, wax, and terpolymer) may vary from about 0 to 8. The preferred ratio is 0 to 2.

Filler is desirable when it is necessary to coat an open weave or lightweight fabric because it gives bulk to the coating, helping to fill the voids.

A large variety of pigments can be successfully used in this invention. These materials are preferably aqueous dispersions of organic or inorganic pigments and should be anionic in nature. Nonionic dispersed pigments may also be employed if desired, but are not preferred.

The amount of pigment can vary with the depth of shading required, and only the ultimate user can judge his requirements. Essentially any color coating can be made. For a blue coating, the quantity of pigment required to give a bright color shade is from about 0.025 to 0.030 ounce per square yard of coated fabric. Usually below 0.025 ounce per square yard the color depth is too lean, while at greater than 0.03 ounce per square yard, pigmentation is too intense. To achieve the correct pigmentation level, one must first find out what his coating weights are with the coating system he is using and then adjust the pigment level accordingly.

To improve brightness, it is desirable to add titanium dioxide in addition to the colored pigment. Usually one used titanium dioxide to the extent of four times the dry weight of colored pigment. Titanium dioxide is best added as an aqueous slurry of up to about 70 percent solids. For white pigmented coatings, titanium dioxide is used alone. Usually about 10 percent of the dry weight of the coating should be titanium dioxide to give an acceptably bright coating. The percentage of titanium dioxide in the coating can be raised or lowered from the 10 percent level according to the pigmentation needs of the user. For non-white coatings, rutile titanium dioxide is preferred because of its improved hiding power and better chalk resistance. For white coatings, a mixture of rutile and anatase titanium dioxide is preferred. The chalking of the anatase gives the white coating a better and clearer appearance.

For certain coating application techniques it is desirable to increase the viscosity of the aqueous coating composition. This may be done by adding materials commonly known as thickening agents, which are viscosity modifiers. A number of these agents have been found useful for the compositions used in this invention. Examples of some materials that are useful are copolymers of methyl vinyl ether and maleic anhydride, polyethylene oxide polymers, hydroxyethyl cellulose, and polyacrylic acid polymers that have been neutralized with bases, such as ammonium hydroxide. The criteria for a useful thickener are water solubility, compatibility with the composition, and reasonable viscosity stability, the limits for which must be set by the ultimate user. Any thickener meeting these criteria may be employed.

The amount of thickener needed varies according to the solids level in the coating composition and the nature of the thickener. Usually, as the solids content of the coating increases, the amount of thickener needed decreases. On the other hand, at low solids levels, the quantity of thickener may be increased to get to a certain viscosity. The usual quantity of thickener required is from 0 to 15 percent by weight of total solids, preferably from 0 to 6 percent and more preferably from 0.1 to 5 percent by weight. It may be desirable to incorporate a mildewcide into the coating to prevent weakening of cellulosic fabrics by organisms. One material effective for this use is a synergistic mixture of zinc salts of dimethyldithiocarbamic acid and 2-mercaptobenzothiazole ("Fungicide" ZV by Arkansas Company). When the dry weight of this material is 2 percent by weight of the total solids, resistance to organism attack of the cellulose is obtained. Lesser quantities of this component reduce resistance. Salicylanilide and copper 8-quinolinolate have also been found to be useful mildewcides.

Another ingredient which may be added is an antifoaming or defoaming agent which prevents or breaks air entrainment. A variety of these agents is known to those skilled in the art. One particularly effective foam-control agent is marked by Crucible Chemical Co., under the name of "Foamkill" 649, a hydrocarbon-oil-based material.

The pigmented coatings may be formulated with chlorowax (chlorinated paraffin wax) and antimony trioxide to give a flame retardant coating. The ratio of antimony trioxide to chlorowax is within the range of about 0.25:1 to 3:1, preferably 0.5:1 to 2:1. The chlorowax should contain greater than about 50 percent by weight chlorine, preferably between 60 and 70 percent, and the total chlorine content in the coating should be within the range of about 20 to 60 percent by weight.

The type of composition prepared depends upon such considerations as method of application, coating weight desired, and desirability of using a pigmented coating. There are two basic application techniques, padding and blading. In a padding operation the fabric is immersed in a coating bath, at ambient temperature, and led through a device for removing excess coating, a set of wringer rolls, scraping bars, or some other means. Normally, but not always, the padding process utilizes a composition having a viscosity from about 5 to 1500 cps., preferably 50 to 1000 cps. In blade coating, a puddle of coating is placed on top of a horizontally-held fabric, and the blade is drawn through the coating over the fabric surface to give a uniform layer of coating. For this application, it is usually necessary to use a higher coating viscosity, in the range of 1500 to 8000 cps., preferably 2000 to 4000 cps. A higher viscosity is necessary to prevent the coating from soaking through to the opposite side of the fabric.

Regardless of what application method is being used, coating weights are best controlled by the solids level in the coating. A useful range of ethylene copolymer/wax and terpolymer coating solids is from 30 to 99 parts by weight per 100 parts by weight of total coating on a dry basis. A preferred range is 35 to 70 parts by weight per 100 parts of total coating on a dry basis. The coating weight used depends upon the performance requirements. For simple water repellency, 0.1 to 0.2 oz./yd.$^2$ of dry coating may be sufficient; but, for a high performance system, as much as 3.0 to 3.5 oz./yd.$^2$ may be desirable.

Compositions are prepared according to the type of coating system being employed. A nonpigmented type of water-repellent coating can be prepared by mixing the ethylene copolymer/wax dispersion with an emulsion of the terpolymer and adjusting the solids level to the desired degree with water. The pH should be adjusted to about 10 with aqueous ammonium hydroxide. Mixtures must be agitated to insure homogeneity. It does not appear to be necessary that the terpolymer be completely dissolved in the aqueous phase; however, it should at least be uniformly dispersed.

Compositions containing filler, pigment, and thickeners may be prepared by first charging the calculated quantity of water into a suitable tank or container equipped with an agitator. Aqueous concentrated ammonia is added to adjust the pH to about 10. Coating filler is added under agitation. The mixture is agitated until the filler is completely dispersed. The wax dispersion, containing the ethylene copolymer, wax, and terpolymer resin are then added. If a defoamer is necessary, it should be added at this point. Agitation for 5–30 minutes is usually sufficient to blend in the dispersion. The pigments are then added and blended. This step is completed when the pigmentation of the mixture is homogeneous. The final step is the addition of the thickener. Agitation of the mixture containing thickener should be conducted in such a fashion as to minimize air entrainment. Removal of the air from the thickened composition is extremely difficult. When the mixture becomes homogeneous after blending in the thickener, the composition is ready for use.

After the coating is prepared, it may be applied to the fabric in a number of ways, such as blading, padding, or any other suitable technique known to those skilled in the art. As soon as the coating is applied, it is desirable to place the coated fabric into an oven or other suitably heated zone for curing. Curing temperatures may range from 300°–500°F. The curing time is related to the oven temperature. At relatively low temperatures, about 300°F., the curing time is longer than at relatively high temperatures, about 380°F. Under most conditions a curing time of 0.5 to 5 minutes is sufficient. A low solids composition may require more curing time than one having high solids because there is more water to remove from the coating. Usually in a blade-coated sample, one minute per side is a sufficient length of time to cure the coating when the oven temperature is 300° to 350°F. When padding (bath technique) is employed, 2 to 5 minutes may be required at the same temperature. At higher temperatures the curing time can be reduced, but one must use care to avoid degrading the fabric by excessive heating. Curing can be judged to be complete by determining whether the coating is wetted when a light spray of water is directed on the coating.

These coatings have been applied to cotton, polyester (Dacron), and nylon fabric. Fabrics composed of blends of cotton and polyester may also be coated with the compositions of the invention.

EXAMPLES OF THE INVENTION

The following examples illustrate the invention. Test methods for evaluating performance of coated fabric of this invention are:

Spray Rating

AATCC Test Method 22–1967 (ASTM D-583-63)

Hydrostatic Pressure Test

AATCC Test Method 127–1968 (ASTM D-583-63)

Crock Resistance

AATCC Test Method 8–1969 (1 worst to 5 no crocking)

Moisture Vapor Transmission Rate

Described by John H. Skinkle, "Textile Testing", Second Edition, Chemical Publishing Company, Inc., Brooklyn, New York, 1949, Pages 96–97.

Rain Test

The rainproof test is conducted by flowing water at a rate of 270 inches/hour (1.5 gallons/min.) from a height of 60 inches onto a fabric sample 8 inches by 7.5 inches for 30 minutes and measuring the amount of water passing through the fabric. Fabric that passes less than 100 ml./30 min. is characterized as having satisfactory rainproofness.

Examples 1 to 19, 22, 25 and 27 illustrate the usefulness of this invention. The compositions of these examples provide coated fabrics which have a soft, pliable hand. Examples 20 and 21 illustrate control compositions. Coating composition 20 contains no terpolymer and gives a boardy or harsh hand to a coated fabric. Coating composition 21 contains no copolymer/wax component. Fabric coated with composition 21 does not have satisfactory water repellency. Examples 23, 24, 26, 28 to 30 are also control examples wherein Examples 23 and 26 utilize no amine soap surfactants; Examples 24 and 26 utilize waxes other than paraffins; Examples 28 and 29 utilize less than 20% by weight ethylene in the terpolymer; and Example 30 utilizes no ethylene copolymer/wax dispersion. Example 23 has poor performance in the hydrostatic pressure test since it does not support a six inch column of water for ten minutes. Example 24 has a spray rating of 90 indicating that a few beads of water were retained on the fabric surface at the end of the test; the rain test showed leakage of 99 ml. of water, just under the maximum limit of 100 ml. Examples 26 and 26A utilize a nonparrafin wax, "Chlorowax" LV, and no amine soap surfactant. The compositions have no water repellent properties as indicated by spray rating, hydrostatic pressure test, and the rain test. The fabric also has a poor hand. Example 28 wherein the terpolymer of the emulsion portion contains 5.5% ethylene by weight has a stiff and boardy hand as well as a marginal rain test. Examples 29 and 29A were of similar composition to Example 22 but contain a slightly different terpolymer composition which includes only 17.6% by weight ethylene. The rain test was marginal. Example 30 is similar to Example 21 since it contains no ethylene copolymer/wax dispersion. The composition has poor water repellent properties judging from the spray rating and hydrostatic pressure test results.

The formulation components of the compositions are given in Table I, Part A. The compositions of Examples 1 to 21 are summarized in Table I, Part B. The compositions of Examples 22 to 30 are summarized in Table I, Part C. Viscosites were determined using a Brookfield LVT, 6 rpm, No. 3 spindle.

TABLE I - PART A

FORMULATION COMPONENTS

| Components | % Solids | Symbol |
|---|---|---|
| Water | — | A |
| 28% aqueous ammonia | — | B |
| No. 2 coating clay | 100 | C |
| Powdered calcium carbonate[a] | 100 | D |
| Antimony oxide powder | 100 | E |
| Titanium dioxide slurry[b] | 72 | F |
| Ethylene/methacrylic acid (89/11) copolymer[c]/143°F. paraffin wax (15/85) dispersion | 56 | G |
| Ethylene/methacrylic acid (89/11) copolymer[d]/143°F. paraffin wax (15/85) dispersion | 59 | H |
| Ethylene/methacrylic acid (89/11) copolymer[c]/180°F. microcrystalline wax (15/85) dispersion | 56 | I |
| Ethylene/methacrylic acid (89/11) copolymer[e]/143°F. paraffin wax (15/85) dispersion | 65 | J |
| Ethylene/methacrylic acid (89/11) copolymer[d]/"Chlorowax" LV[f] (15/85) dispersion | 57 | K |
| Ethylene/methacrylic acid (89/11) copolymer[c]/133°F. paraffin wax (15/85) dispersion | 57 | L |
| Ethylene/methacrylic acid (85/15) copolymer dispersion[g] | 20 | M |
| Vinyl acetate/ethylene/N-methylol acrylamide (70.2/25/4.8) emulsion, aqueous[h] | 50 | N |
| Vinyl acetate/ethylene/N-methylol acrylamide (70.6/24/5.4) emulsion, aqueous[h] | 50 | O |
| Vinyl acetate/ethylene/N-methylol acrylamide (89.9/5.5/4.8) emulsion, aqueous[i] | 50 | P |
| Vinyl acetate/ethylene/N-methylol acrylamide (76.4/17.6/6.0) emulsion, aqueous[h] | 50 | Q |
| Chlorinated alkane dispersion[j] | 73 | R |
| Low molecular weight methylated melamine formaldehyde resin[k] | 80 | S |
| Organic non-silicone defoamer[l] | 100 | T |
| Aqueous dispersed blue pigment[m] | 30 | U |
| Aqueous dispersed green pigment[n] | 33 | V |
| Aqueous dispersed red pigment[o] | 24 | W |
| Lauryl pentachlorophenate[p] | 47 | X |
| Salicylanilide[q] | 100 | Y |
| Copper 8-quinolinolate[r] | 50 | Z |
| Zinc dimethyldithiocarbamate/zinc 2-mercaptobenzothiazole[s] | 25 | AA |
| Polyacrylic acid, ammonium salt[t] | 22 | BB |
| Polyacrylic acid, ammonium salt[u] | 2.8 | CC |
| 2-Ethylhexyl diphenyl phosphate[v] | 100 | DD |

[a] No. 10 Whiting, Georgia Marble Company.
[b] Ti-Pure Titanium Dioxide LW-S, Du Pont.
[c] MI 100, 75% neutralized with NaOH. Contains 5% dimerized wood rosin based on total solids. Dimerized wood rosin was neutralized with ammonium hydroxide.
[d] MI 100, 75% neutralized with NaOH. Contains 2.5 dry weight percent sodium lauryl sulfate, added as DuPonol WAQE, Du Pont, based on the weight of the copolymer and wax.
[e] MI 100, 60% neutralized with NaOH. Contains 5% dimerized wood rosin based on solids. Dimerized wood rosin was neutralized with ammonium hydroxide.
[f] Diamond Shamrock Chemical Company. Molecular weight 460. Chlorine content 39%. Viscosity at 25°C. 7 poises.
[g] MI 60, 60% neutralized with NaOH.
[h] The surfactant was a phosphate ester of alkyl phenol-ethylene oxide, 3% by weight of the weight of the terpolymer.
[i] The surfactants were a mixture of 0.5% by weight of a phosphate ester of alkyl phenol-ethylene oxide and 2% by weight sodium salt of dodecyl benzene sulfonic acid.
[j] Chlorinated alkane (60% chlorine) was "Chlorowax" 500, Diamond Shamrock Chemical Company. Dispersion contained 8% by weight of dimerized wood rosin, neutralized with ammonium hydroxide, based on chlorinated alkane.
[k] "Crosslinking Agent" 370, American Cyanamid Company.
[l] "Foamkill" 649, Crucible Chemical Company.
[m] "Imperse Blue" X3221, Hercules, Inc.
[n] "Monastral" Green B, GW-749-P, Du Pont.
[o] "Hi-Fast" BDC, Inmont Corporation.
[p] "Durotex" 7665-A, Ventron Corporation.
[q] "Shirlan Extra", Du Pont
[r] "Cunilate" 2419, Ventron Corporation.
[s] "Fungicide" ZV, Arkansas Company.
[t] "Acrysol" G-110, Rohm and Haas.
[u] A composition consisting of 82 parts by weight of water, 14 parts by weight of "Acrysol" ASE-95, Rohm and Haas, 4 parts by weight of 28% aqueous ammonium hydroxide.

TABLE I - PART B

COMPOSITIONS OF WATER REPELLENT COATINGS
PARTS BY WEIGHT, WET BASIS

| COMPONENT SYMBOL | 1 | 2 | 3 | 4 | 5 | 6 | 7 | 8 | 9 | 10 | 11 | 12 | 13 |
|---|---|---|---|---|---|---|---|---|---|---|---|---|---|
| A | 1575 | 105.4 | 77.7 | 32.9 | 7.6 | 45.2 | 28.3 | 66.2 | 51.6 | 39.9 | 22.5 | 99.1 | 119.1 |
| B | 320 | 12.5 | 14.0 | 15.6 | 17.2 | 12.3 | 13.7 | 10.5 | 11.8 | 12.2 | 13.6 | 10.9 | 9.4 |
| C | 320 | 17.5 | 20.0 | 22.5 | 25.0 | — | — | — | — | — | — | 40.0 | 60.0 |
| D | — | — | — | — | — | 45.0 | 50.0 | 45.0 | 50.0 | 45.0 | 50.0 | — | — |
| E | — | — | — | — | — | — | — | — | — | — | — | — | — |
| F | 156 | 6.7 | 9.7 | 10.2 | 12.2 | 9.4 | 10.4 | 46.9 | 52.1 | 9.4 | 10.4 | 8.3 | 8.3 |
| G | 2295 | 86.9 | 99.3 | 112.6 | 125.6 | 120.3 | 134.4 | 103.1 | 115.4 | 119.5 | 133.5 | 107.1 | 92.6 |
| H | — | — | — | — | — | — | — | — | — | — | — | — | — |
| I | — | — | — | — | — | — | — | — | — | — | — | — | — |
| J | — | — | — | — | — | — | — | — | — | — | — | — | — |
| K | — | — | — | — | — | — | — | — | — | — | — | — | — |
| L | — | — | — | — | — | — | — | — | — | — | — | — | — |
| M | — | — | — | — | — | — | — | — | — | — | — | — | — |
| N | 2570 | 194.1 | 221.8 | 251.6 | 280.7 | 198.7 | 222.2 | 170.5 | 190.6 | 197.4 | 220.7 | 177.1 | 153.1 |
| O | — | — | — | — | — | — | — | — | — | — | — | — | — |
| P | — | — | — | — | — | — | — | — | — | — | — | — | — |
| Q | — | — | — | — | — | — | — | — | — | — | — | — | — |
| R | — | — | — | — | — | — | — | — | — | — | — | — | — |
| S | — | — | — | — | — | — | — | — | — | — | — | — | — |
| T | 22 | 1.3 | 1.3 | 1.3 | 1.3 | 0.6 | 0.6 | 0.6 | 0.6 | 0.6 | 0.6 | 1.3 | 1.3 |
| U | 160 | 13.1 | 13.3 | 13.1 | 12.5 | 11.3 | 12.5 | — | — | — | — | 13.3 | 13.3 |
| V | — | — | — | — | — | — | — | — | — | — | — | — | — |
| W | — | — | — | — | — | — | — | — | — | 18.8 | 20.8 | — | — |
| X | — | — | — | — | — | — | — | — | — | — | — | — | — |

TABLE I - PART B — Continued

COMPOSITIONS OF WATER REPELLENT COATINGS
PARTS BY WEIGHT, WET BASIS

| COMPONENT SYMBOL | 1 | 2 | 3 | 4 | 5 | 6 | 7 | 8 | 9 | 10 | 11 | 12 | 13 |
|---|---|---|---|---|---|---|---|---|---|---|---|---|---|
| Y | — | — | — | — | — | — | — | — | — | — | — | — | — |
| Z | — | — | — | — | — | 9.0 | 10.0 | 9.0 | 10.0 | 9.0 | 10.0 | — | — |
| AA | — | — | — | — | — | — | — | — | — | — | — | — | — |
| BB | 582 | — | — | — | — | — | — | — | — | — | — | — | — |
| CC | — | 62.5 | 42.9 | 40.2 | 17.9 | 48.2 | 17.9 | 48.2 | 17.9 | 48.2 | 17.9 | 42.9 | 42.9 |
| DD | — | — | — | — | — | — | — | — | — | — | — | — | — |
| TOTAL | 8000 | 500 | 500 | 500 | 500 | 500 | 500 | 500 | 500 | 500 | 500 | 500 | 500 |
| % Solids | 40 | 35 | 40 | 45 | 50 | 45 | 50 | 45 | 50 | 45 | 50 | 40 | 40 |
| Viscosity, cps., 6 rpm | 4250 | 3300 | 2700 | 4600 | 2500 | 4400 | 2700 | 3800 | 2800 | 4200 | 2600 | 2900 | 3300 |

| COMPONENT SYMBOL | 14 | 15 | 16 | 17 | 18 | 19 | 20 (Control) | 21 (Control) |
|---|---|---|---|---|---|---|---|---|
| A | 123.4 | 75.1 | 79.0 | 76.7 | 338.7 | 85.9 | 169.4 | 115.3 |
| B | 20.0 | 12.2 | 12.3 | 12.2 | 30.0 | 6.9 | — | — |
| C | 20.0 | 20.0 | 20.0 | — | — | — | 78.1 | 20.0 |
| D | — | — | — | — | — | 40.0 | — | — |
| E | — | — | — | 43.3 | — | — | — | — |
| F | 9.7 | 8.3 | 8.3 | 2.8 | — | 8.3 | 15.0 | 12.5 |
| G | 139.8 | 120.2 | 120.8 | 22.0 | 156.3 | 104.9 | 100.5 | — |
| H | — | — | — | — | — | — | — | — |
| I | — | — | — | — | — | — | — | — |
| J | — | — | — | — | — | — | — | — |
| K | — | — | — | — | — | — | — | — |
| L | — | — | — | — | — | — | — | — |
| M | — | — | — | — | — | — | 94.5 | — |
| N | 156.6 | 198.7 | 199.6 | 36.3 | 175.0 | 173.1 | — | 320 |
| O | — | — | — | — | — | — | — | — |
| P | — | — | — | — | — | — | — | — |
| Q | — | — | — | — | — | — | — | — |
| R | — | — | — | 27.6 | — | — | — | — |
| S | — | — | — | — | — | — | 7.8 | — |
| T | 1.4 | 1.3 | 1.3 | 0.3 | — | 1.3 | — | — |
| U | 10.0 | 13.3 | 13.3 | — | — | 10.0 | 8.8 | 10.0 |
| V | — | — | — | 6.1 | — | — | — | — |
| W | — | — | — | — | — | — | — | — |
| X | — | — | 5.0 | — | — | — | — | — |
| Y | 10.0 | — | — | — | — | — | — | — |
| Z | — | 8.0 | — | — | — | — | — | — |
| AA | — | — | — | — | — | 16.0 | — | — |
| BB | 9.1 | — | — | 22.7 | — | — | 35.9 | 18.2 |
| CC | — | 42.9 | 42.9 | — | — | 53.6 | — | — |
| DD | — | — | — | — | — | — | — | 4.0 |
| TOTAL | 500 | 500 | 502.5 | 250 | 700 | 500 | 510 | 500 |
| % Solids | 40 | 40 | 40 | 40 | 25 | 40 | 35 | 40 |
| Viscosity, cps. 6 rpm | 2700 | 3200 | 3100 | 2800 | — | 3700 | 3600 | 7800 |

TABLE I - PART C

COMPOSITIONS OF WATER REPELLENT COATINGS
PARTS BY WEIGHT, WET BASIS[a]

| COMPONENT SYMBOL | 22 | 23 | 24 | 25 | 26 | 26A | 27 | 28 | 29 | 29A | 30 |
|---|---|---|---|---|---|---|---|---|---|---|---|
| A | 85.9 | 85.9 | 85.9 | 85.9 | 85.9 | 43.0 | 85.9 | 85.9 | 85.9 | 43.0 | 73.5 |
| B | 6.9 | 6.9 | 6.9 | 6.9 | 6.9 | 3.4 | 6.9 | 6.9 | 6.9 | 3.4 | 6.9 |
| C | — | — | — | — | — | — | — | — | — | — | — |
| D | 40 | 40 | 40 | 40 | 40 | 20 | 40 | 40 | 40 | 20 | 40 |
| E | — | — | — | — | — | — | — | — | — | — | — |
| F | 8.3 | 8.3 | 8.3 | 8.3 | 8.3 | 4.2 | 8.3 | 8.3 | 8.3 | 4.2 | 8.3 |
| G | 104.9 | — | — | — | — | — | — | 104.9 | 104.9 | 52.6 | — |
| H | — | 104.9 | — | — | — | — | — | — | — | — | — |
| I | — | — | 104.9 | — | — | — | — | — | — | — | — |
| J | — | — | — | 104.9 | — | — | — | — | — | — | — |
| K | — | — | — | — | 104.9 | 52.4 | — | — | — | — | — |
| L | — | — | — | — | — | — | 104.9 | — | — | — | — |
| M | — | — | — | — | — | — | — | — | — | — | — |
| N | — | — | — | — | — | — | — | — | — | — | — |
| O | 173.1 | 173.1 | 173.1 | 173.1 | 173.1 | 86.5 | 173.1 | — | — | — | 290.4 |
| P | — | — | — | — | — | — | — | 173.1 | — | — | — |
| Q | — | — | — | — | — | — | — | — | 173.1 | 86.5 | — |
| R | — | — | — | — | — | — | — | — | — | — | — |
| S | — | — | — | — | — | — | — | — | — | — | — |
| T | 1.3 | 1.3 | 1.3 | 1.3 | 1.3 | 0.7 | 1.3 | 1.3 | 1.3 | 0.7 | 1.3 |
| U | 10 | 10 | 10 | 10 | 10 | 5 | 10 | 10 | 10 | 5 | 10 |
| V | — | — | — | — | — | — | — | — | — | — | — |
| W | — | — | — | — | — | — | — | — | — | — | — |
| X | — | — | — | — | — | — | — | — | — | — | — |
| Y | — | — | — | — | — | — | — | — | — | — | — |
| Z | — | — | — | — | — | — | — | — | — | — | — |
| AA | 16 | 16 | 16 | 16 | 16 | 8 | 16 | 16 | 16 | 8 | 16 |
| BB | — | — | — | — | — | — | — | — | — | — | — |
| CC | 53.6 | 53.6 | 53.6 | 53.6 | 53.6 | 44.7 | 53.6 | 53.6 | 53.6 | 44.7 | 53.6 |
| DD | — | — | — | — | — | — | — | — | — | — | — |

TABLE I - PART C —Continued

COMPOSITIONS OF WATER REPELLENT COATINGS
PARTS BY WEIGHT, WET BASIS[a]

| COMPONENT SYMBOL | 22 | 23 | 24 | 25 | 26 | 26A | 27 | 28 | 29 | 29A | 30 |
|---|---|---|---|---|---|---|---|---|---|---|---|
| TOTAL | 500 | 500 | 500 | 500 | 500 | 267.9 | 500 | 500 | 500 | 268.1 | 500 |
| % Solids | 40 | 41 | 40 | 42 | 40 | 37.9 | 40 | 40 | 40 | 37.7 | 40 |
| Viscosity, cps. 6 rpm | 3800 | 3650 | 3725 | 3550 | 1925 | 3030 | 2975 | 2600 | 1950 | 3620 | 6700 |

[a]Compositions 26A and 29A were made from compositions 26 and 29, respectively, by adding 17.9 grams of 2.8% ammonium polyacrylate solution (CC) to 250 grams of compositions 26 and 29, respectively. The additional ammonium polyacrylate solution was added to raise the viscosities to a level more nearly comparable with the other compositions.

EXAMPLE 1

Composition 1 was coated by means of a coating using a ⅛ inch thick aluminum blade mounted perpendicular to the fabric and parallel to the fill or cross direction of the fabric. A puddle of coating was maintained behind the blade and the fabric was passed under the blade at the rate of 4.5 feet per minute. The coated fabric was then passed through a heated oven having a length of 9 feet and maintained at 360°F. Fabric width was approximately 15 inches. After the goods were coated on one side, they were turned over and coated on the reverse side. The fabrics coated and their weight, as well as the properties of the coated fabrics, are shown in Table II.

TABLE II

| Fabric Type | Weight oz./yd.² | Calend. After Coating | Wt. of Coating oz./yd.² | Spray Rating | Hydro-Static Press. In. | Crock Fastness Dry | Crock Fastness Wet | Moist. Vapor Trans. Rate | Rain Test ml./30 Min. |
|---|---|---|---|---|---|---|---|---|---|
| Cotton | 6.0 | No | 2.1 | 100 | 19 | 4 | 3 | — | 35 |
| Cotton | 6.0 | Yes | 2.1 | 100 | 21 | 5–4 | 4—3 | 478 | 12 |
| Cotton | 6.5 | Yes | 1.2 | 100 | 20 | 5–4 | 3 | — | 11 |
| Polyester | 6.6 | No | 1.7 | 100 | >24 | 4–3 | 5–4 | 114 | 0 |
| Polyester | 6.6 | Yes | 1.8 | 100 | >24 | 4 | 4–3 | 148 | 4 |
| Polyester | 6.4 | No | 1.7 | 100 | >24 | 4–3 | 3 | 100 | Nil |
| Polyester | 6.4 | Yes | 1.7 | 100 | >24 | 4 | 4–3 | 172 | 0 |
| Nylon | 10.0 | No | 4.0 | 100 | >24 | 3 | 4 | 114 | 0 |
| Nylon | 10.0 | Yes | 3.8 | 100 | >24 | 3 | 5–4 | 154 | Nil |
| Nylon | 1.5 | No | 1.0 | 100 | >24 | 4 | 4–3 | — | — |
| Nylon | 1.5 | Yes | 0.9 | 100 | >24 | — | — | 165 | — |

EXAMPLE 2

Composition 2 had a viscosity of 3,300 cps. at make up. After five days, the viscosity was 2,900 cps., and after twelve days, the viscosity was 2,800 cps.

EXAMPLE 3

Composition 3 was blade coated as described in Example 1 on several different fabrics as noted below and cured for 1.25 minutes at an oven temperature of 175°C. for each side. The properties of the coated fabric were:

| Fabric Type | Weight oz./yd.² | Wt. of Coating oz./yd.² | Spray Rating | Hydro-Static Press., in. | Crock Fastness Dry | Crock Fastness Wet |
|---|---|---|---|---|---|---|
| Cotton | 6.0 | 1.9 | 100 | >24 | 4–3 | 4–3 |
| Polyester | 6.4 | 3.0 | 100 | >24 | 4–3 | 4 |
| Polyester | 6.6 | 2.7 | 100 | >24 | 4–3 | 4 |
| Polyester | 5.9 | 2.9 | 100 | >24 | 4 | 5–4 |

Composition 3 had a viscosity of 2,900 cps. after standing for 12 days.

EXAMPLE 4

Composition 4 had a viscosity of 4,600 cps. at make up and after 12 days, the viscosity was 5,000 cps.

EXAMPLE 5

Composition 5 had a viscosity of 2,500 cps. at make up and after 12 days, the viscosity was 3,550 cps.

EXAMPLE 6

Composition 6 was blade coated as described in Example 1 on 6.7 oz./yd.² cotton fabric and cured at 175°C. for 1.25 minutes. The weight of the dry coating was 2.3 oz./yd.². The coated fabric had a hydrostatic pressure of >24 inches and a spray rating of 100. The viscosity of composition 6 was 5,100 cps. after ten days.

EXAMPLE 7

Composition 7 was blade coated as described in Example 1 on 6.7 oz./yd.² cotton fabric and cured at 175°C. for 1.25 minutes. The weight of the dry coating was 2.4 oz./yd.². The coated fabric had a hydrostatic pressure of >24 inches and a spray rating of 100. The viscosity of the composition was 4,000 cps. after ten days.

EXAMPLE 8

Composition 8, pigmented white, was blade coated as described in Example 1 on 6.7 oz./yd.² cotton fabric and cured at 175°C. for 1.25 minutes. Weight of the dry coating was 2.2 oz./yd.². The coated fabric had a hydrostatic pressure of >24 inches and a spray rating of 100. The viscosity of the composition was 4,100 cps. after 9 days.

EXAMPLE 9

Composition 9, pigmented white, was blade coated as described in Example 1 on 6.7 oz./yd.$^2$ cotton fabric and cured at 175°C. for 1.25 minutes. Weight of the dry coating was 2.6 oz./yd.$^2$. The coated fabric had a hydrostatic pressure of >24 inches and a spray rating of 100. The composition had a viscosity of 2,800 cps. after 9 days.

EXAMPLE 10

Composition 10, pigmented red, was blade coated as described in Example 1 on 6.7 oz./yd.$^2$ cotton fabric and cured at 175°C. for 1.25 minutes. Weight of the dry coating was 2.2 oz./yd.$^2$. The coated fabric had a hydrostatic pressure of >24 inches and a spray rating of 100. The composition had a viscosity of 4,500 cps. after 8 days.

EXAMPLE 11

Composition 11, pigmented red, was blade coated as described in Example 1 on 6.7 oz./yd.$^2$ cotton fabric and cured at 175°C. for 1.25 minutes. Weight of the dry coating was 2.5 oz./yd.$^2$. The coated fabric had a hydrostatic pressure of >24 inches and a spray rating of 100. The composition had a viscosity of 2,800 cps. after 8 days.

EXAMPLE 12

Composition 12 was blade coated as described in Example 1 on 6.5 oz./yd.$^2$ cotton fabric and cured at 175°C. for 1.25 minutes. Weight of the dry coating was 2.5 oz./yd.$^2$. The coated fabric had crock fastness values of 3 (dry) and 3-2 (wet). In the 30-minute rain test, the coated fabric did not leak. The composition had a viscosity of 3,500 cps. after 13 days.

EXAMPLE 13

Composition 13 was blade coated as described in Example 1 on 6.5 oz./yd.$^2$ cotton fabric and cured at 175°C. for 1.25 minutes. Weight of the dry coating was 2.7 oz./yd.$^2$. The coated fabric had crock fastness values of 3-2 (dry) and 2-1 (wet). In the 30-minute rain test, the coated fabric leaked only a few drops. The composition had a viscosity of 3,800 cps. after 13 days.

EXAMPLE 14

Composition 14 was blade coated as described in Example 1 on cotton fabric and cured at 175°C. for 1.25 minutes. One sample was leached in water for 16 hours, and one sample was not. Both samples were subjected to a soil burial test for 14 days to determine resistance to fungicide attack. Fabric strengths of the cured samples were measured on an Instron Tester at a crosshead speed of 2 inches/minute. The leached sample exhibited 100% and 83% strength retention in the warp and fill directions, respectively. The unleached sample had 49% and 36% strength retention in the warp and fill directions, respectively.

EXAMPLE 15

Composition 15 was blade coated as described in Example 1 on 6.5 oz./yd.$^2$ cotton fabric and cured at 175°C. for 1.25 minutes. The weight of the coating was 2.3 oz./yd.$^2$. The coated fabric had a spray rating of 100, a hydrostatic pressure of 15 inches, and crock fastness values of 2 (dry) and 3-2 (wet). A coated fabric sample was subjected to a 14-day soil burial test. The exposed fabric had a strength retention of 27% after the burial test. After 15 days the composition had a viscosity of 3,500 cps.

EXAMPLE 16

Composition 16 was blade coated as described in Example 1 on 6.5 oz./yd.$^2$ cotton fabric and cured at 175°C. for 1.25 minutes. The weight of the coating was 2.7 oz./yd.$^2$. The coated fabric had a spray rating of 100 and a hydrostatic pressure of 24 inches. In a 14-day soil burial test, the coated fabric exhibited a 7% retention in strength. The composition had a viscosity of 4,700 cps. after 15 days.

EXAMPLE 17

Composition 17 was blade coated as described in Example 1 on 6.5 oz./yd.$^2$ cotton fabric and cured at 175°C. for 1.25 minutes. The weight of the coating was 2.5 oz./yd.$^2$. The coated fabric had a spray rating of 100 and a hydrostatic pressure of 18 inches. A 2 inch × 5 inch strip of fabric was held vertically in a flame for 10 seconds. After removal of the flame, the flame on the coated goods self-extinguished. There was some afterglow, which consumed up to one inch of the base of the fabric.

EXAMPLE 18

Composition 18 was applied to 2 oz./yd.$^2$ predyed, nylon goods by padding, using squeeze rolls with 10 pounds total weight on the roll. The padded samples were cured at 180°C. for 1.25 minutes. The weight of the coating was 0.25 oz./yd.$^2$. The spray rating was 100, and the hydrostatic pressure was >24 inches. The coated sample had a moisture vapor transmission rate of 756 grams of water per 24 hours per square meter.

EXAMPLE 19

Composition 19 was blade coated as described in Example 1 on 6 oz./yd.$^2$ cotton fabric and cured at 175°C. for 1.25 minutes per side. The weight of the dry coating was 2.94 oz./yd.$^2$. The coated fabric had a spray rating of 100. The hydrostatic pressure of the coated fabric was 20 inches. The coated fabric had a soft, pliable hand. The formulated composition had a viscosity of 3,300 cps. after 14 days. A sample of the coated fabric was leached for 18 hours in a tank with fresh water flowing into the tank continuously. Samples of the leached and unleached fabric were subjected to 14-day soil trial tests. After the test, strength measurements were made on the fabrics. The unleached sample had a strength retention of 84%; the leached sample had a strength retention of 71%.

EXAMPLE 20

Composition 20 was blade coated as described in Example 1 on 6.5 oz./yd.$^2$ 100% Dacron polyester, woven fabric and cured at 170°C. for 1.25 minutes per side. The weight of the dry coating was 2.27 oz./yd.$^2$. The coated fabric had a spray rating of 90–100 and a hydrostatic pressure of >24 inches. The hand of the fabric was boardy, and the coated fabric had a papery feel.

EXAMPLE 21

Composition 21 was blade coated as described in Example 1 on 7.5 oz./yd.² 100% Dacron polyester, woven fabric and cured at 170°C. for 1.25 minutes per side. The dry weight of the coating was 2 oz./yd.². The coated fabric had an excellent hand, but the spray rating was 50.

EXAMPLES 22 to 30

Compositions 22 to 30 were blade coated on a 6.3 oz./yd.² bleached cotton drill fabric and cured at 170°C. for 1.25 minutes. The coated goods were subjected to tests listed in Table III. A summary of polymer types used in these Examples is listed in Table IV.

TABLE III

PERFORMANCE DATA ON COATED FABRICS — EXAMPLES 22 TO 30
PERFORMANCE OF COATED FABRICS

|  | 22 | 23 | 24 | 25 | 26 | 26A | 27 | 28 | 29 | 29A | 30 |
|---|---|---|---|---|---|---|---|---|---|---|---|
| Coating weight, % of Fabric Weight | 32 | 35 | 32 | 35 | 32 | 28 | 27 | 34 | 30 | 28 | 36 |
| Spray rating | 100 | 100 | 90 | 100 | 0 | 0 | 100 | 100 | 100 | 100 | 50 |
| Hydrostatic pressure test |  |  |  |  |  |  |  |  |  |  |  |
| Minutes at 6" water | >10 | 3.5 | >10 | >10 | 0 | 0 | >10 | >10 | >10 | >10 | 0.5 |
| Inches of water at failure | 24 | — | 10 | 16 | — | — | 18 | 27 | 14 | 10 | — |
| Crock fastness |  |  |  |  |  |  |  |  |  |  |  |
| Dry | 3–2 | 2 | 2–1 | 4 | 2 | 2 | 3–2 | 4–3 | 3–2 | 4 | 4 |
| Wet | 4 | 4 | 4 | 4 | 2 | 3–2 | 4 | 4 | 4–3 | 4–3 | 4 |
| Rain test, ml./30 min. | 8 | 32 | 99 | 36 | 117 | 526 | 36 | 97 | 98 | 100 | 61 |
| Hand | Good | Good | Good | Good | Limp Tacky | Limp Tacky | Good | Boardy | Good | Good | Good |

TABLE IV

SUMMARY OF POLYMER TYPES USED IN EXAMPLES

| Example No. | Ionic Copolymer/Wax Dispersion | | | Terpolymer Emulsion | | | |
|---|---|---|---|---|---|---|---|
|  | Wax Type | % Ionomer Neutralized | Surfactant Type | % VAc | % E | % -MAA | Surfactant Type |
| 22 | 143°F. paraffin wax | 75 | Dimerized wood rosin⁽ᵃ⁾ | 70.6 | 24 | 5.4 | 3% alkyl phenolethylene oxide |
| 23 | 143°F. paraffin wax | 75 | Sodium lauryl sulfate | 70.6 | 24 | 5.4 | 3% alkyl phenolethylene oxide |
| 24 | 180°F. microcrystalline wax | 75 | Dimerized wood rosin⁽ᵃ⁾ | 70.6 | 24 | 5.4 | 3% alkyl phenolethylene oxide |
| 25 | 143°F. paraffin wax | 60 | Dimerized wood rosin⁽ᵃ⁾ | 70.6 | 24 | 5.4 | 3% alkyl phenolethylene oxide |
| 26 | "Chlorowax" LV | 75 | Sodium lauryl sulfate | 70.6 | 24 | 5.4 | 3% alkyl phenolethylene oxide |
| 27 | 133°F. paraffin wax | 75 | Dimerized wood rosin⁽ᵃ⁾ | 70.6 | 24 | 5.4 | 3% alkyl phenolethylene oxide |
| 28 | 143°F. paraffin wax | 75 | dimerized wood rosin⁽ᵃ⁾ | 89.9 | 5.5 | 4.8 | 2% sodium dodecyl benzene sulfonate |
| 29 | 143°F. paraffin wax | 75 | dimerized wood rosin⁽ᵃ⁾ | 76.4 | 17.6 | 6.0 | 3% alkyl phenolethylene oxide |
| 30 | — | — | — | 70.6 | 24 | 5.4 | 3% alkyl phenolethylene oxide |

⁽ᵃ⁾ammonium salt.

We claim:

1. An aqueous dispersion comprising a mixture of (1) a dispersion of an ethylene copolymer comprising at least 30 percent by weight ethylene and up to 70 percent by weight of an alpha, beta-ethylenically unsaturated carboxylic acid, 40 to 75 percent of said acid groups being neutralized with alkali metal ions, and a paraffin wax, the dry weight ratio of wax to ethylene copolymer being 1:1 to 19:1, the ethylene copolymer and wax dispersion being held in dispersed phase by 1.0 to 15.0 percent by weight, based on the weight of ethylene copolymer and wax, of an amine soap surfactant, and (2) a terpolymer emulsion comprising 64 to 77 percent by weight vinyl acetate, 20 to 30 percent by weight ethylene and 3 to 6 percent by weight N-methylol acrylamide, the dry weight ratio of ethylene copolymer and wax dispersion to terpolymer emulsion being from 70:30 to 20:80.

2. A dispersion according to claim 1 wherein the ethylene copolymer comprises at least 70 percent by weight ethylene and up to 30 percent by weight methacrylic acid, 60 to 75 percent of said acid groups being neutralized with alkali metal ions.

3. A dispersion according to claim 1 wherein the dry weight ratio of wax to ethylene copolymer is about 1.5:1 to 6:1.

4. A dispersion according to claim 1 wherein the amine soap surfactant is taken from the group consisting of an ammonium and volatile amine salt of wood rosin, dimerized wood rosin, and fatty acids having about 17 to 24 carbon atoms.

5. A dispersion according to claim 1 wherein the amine soap surfactant is the ammonium salt of dimerized wood rosin.

6. A dispersion according to claim 1 wherein the amine soap surfactant is present in an amount of 3 to 7 percent by weight, based on the weight of ethylene copolymer and wax.

* * * * *